(12) United States Patent
Lee

(10) Patent No.: US 9,035,618 B2
(45) Date of Patent: May 19, 2015

(54) BATTERY PACK AND METHOD OF CONTROLLING THE SAME

(75) Inventor: Myung-Jun Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 820 days.

(21) Appl. No.: 13/159,310

(22) Filed: Jun. 13, 2011

(65) Prior Publication Data

US 2012/0032646 A1  Feb. 9, 2012

(30) Foreign Application Priority Data

Aug. 6, 2010 (KR) .................. 10-2010-0075986

(51) Int. Cl.
*H02J 7/00* (2006.01)
*H02J 7/04* (2006.01)
*H02J 3/12* (2006.01)

(52) U.S. Cl.
CPC .............. *H02J 7/0031* (2013.01); *H02J 3/12* (2013.01); *H02J 7/04* (2013.01); *H02J 7/0026* (2013.01)

(58) Field of Classification Search
CPC ..... H02J 7/045; H02J 7/04; H02J 2007/0067; H02J 2007/0063; H02J 2007/04; H02J 7/011; H02J 7/0078; H02J 3/12
USPC ......... 320/134, 135, 136, 127, 128, 129, 148, 320/149, 165, 132, 114; 361/78, 93.1, 79, 361/87
See application file for complete search history.

(56) References Cited

U.S. PATENT DOCUMENTS

| | | | |
|---|---|---|---|
| 5,717,310 A * | 2/1998 | Sakai et al. | 307/10.1 |
| 5,929,604 A | 7/1999 | Irvin | |
| 6,160,381 A | 12/2000 | Peterzell | |
| 7,990,108 B2 * | 8/2011 | Aas et al. | 320/134 |
| 8,232,775 B2 * | 7/2012 | Eastlack | 320/140 |
| 8,575,917 B2 * | 11/2013 | Sims et al. | 324/120 |
| 8,687,338 B2 * | 4/2014 | Odaohhara | 361/104 |
| 2007/0018615 A1 * | 1/2007 | Graf et al. | 320/160 |
| 2007/0070558 A1 * | 3/2007 | Liu | 361/18 |
| 2008/0284253 A1 * | 11/2008 | Stenfert Kroese et al. | 307/131 |
| 2009/0058505 A1 * | 3/2009 | Yoshio | 327/535 |
| 2009/0085524 A1 * | 4/2009 | Smith et al. | 320/139 |
| 2009/0212742 A1 * | 8/2009 | Sim et al. | 320/134 |
| 2011/0018505 A1 * | 1/2011 | Carson et al. | 323/234 |

FOREIGN PATENT DOCUMENTS

| | | |
|---|---|---|
| JP | 09-200951 A | 7/1997 |
| JP | 2002-504300 A | 2/2002 |
| KR | 10-2001-0032832 A | 4/2001 |
| KR | 10-2006-0002289 A | 1/2006 |
| KR | 10-2009-0043919 A | 5/2009 |

OTHER PUBLICATIONS

Korean Office Action dated Sep. 30, 2011 for Korean Patent Application No. KR 10-2010-0075986 which corresponds to captioned U.S. Appl. No. 13/159,310.

* cited by examiner

*Primary Examiner* — Edward Tso
*Assistant Examiner* — Alexis A Boateng
(74) *Attorney, Agent, or Firm* — Knobbe, Martens, Olson & Bear, LLP

(57) ABSTRACT

A battery pack, and a method of controlling the battery pack are disclosed. The battery pack detects consumption current when a load is not turned on, and shuts off power when a load is turned off or in stand-by mode, thereby preventing consumption current of the load from flowing.

8 Claims, 6 Drawing Sheets is a circuit diagram of a battery pack;
BATTERY PACK AND METHOD OF CONTROLLING THE SAME

CROSS-REFERENCE TO RELATED APPLICATIONS

This application claims the benefit of Korean Patent Application No. 10-2010-0075986, filed on Aug. 6, 2010, in the Korean Intellectual Property Office, the disclosure of which is incorporated herein in its entirety by reference.

BACKGROUND

1. Field

The technical field relates to a battery pack and a method of controlling the same, and more particularly, to a battery pack for detecting and shutting off consumption current of a load, and a method of controlling the battery pack.

2. Description of the Related Technology

In general, research has been actively conducted into rechargeable batteries as large energy storage devices due to the development of portable electronic devices, such as cellular phones, laptop computers, camcorders, and personal digital assistants (PDAs). In particular, various types of rechargeable batteries such as nickel-cadmium batteries, lead storage batteries, nickel metal hydride (NiMH) batteries, lithium-ion batteries, lithium polymer batteries, lithium-metal batteries, and zinc-air storage batteries have been developed. Such rechargeable batteries are combined with circuits to constitute a battery pack, and are charged and discharged by using an external terminal of the battery pack.

A conventional battery pack roughly includes a battery cell, and a peripheral circuit including a charge/discharge circuit. The peripheral circuit is formed as a printed circuit board (PCB) and is combined with the battery cell. When an external power source is connected to the battery pack through an external terminal of the battery pack, the battery cell is charged by the external power source through the external terminal and the charge/discharge circuit. When a load is connected to the battery pack through the external terminal, the battery cell supplies power to the load through the external terminal and the charge/discharge circuit. The charge/discharge circuit is disposed between the external terminal and the battery cell and controls charging and discharging of the battery cell. In general, a plurality of battery cells are used by being connected in series or in parallel according to load consumption.

Consumption current flows through a battery to a set (which means a load), such as a cellular phone or a notebook computer. The consumption current flows through the set even when the set is not driven. When this state is maintained for a long period of time, a battery voltage may be lowered, and thus the set may not be normally driven.

SUMMARY OF CERTAIN INVENTIVE ASPECTS

One aspect of the present invention is a battery pack which includes a battery cell, and a protection circuit for the battery cell. The protection circuit is configured to detect consumption current of a load, and controls discharge in the load, according to the detected consumption current.

Another aspect is a battery pack including a plurality of battery cells, an analog front end IC, a charge switch, a discharge switch, and a computer. The computer detects consumption current of a load, and controls the discharge switch according to the consumption current.

Another aspect is a method of controlling a battery pack including a battery cell, and a protection circuit for the battery cell. The method including: detecting a consumption current of a load, and controlling discharge in the load, according to the detected consumption current.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Hereinafter, various aspects and features are explained in detail with reference to the attached drawings. In the following description, only essential parts necessary to understand operation of the described embodiments will be explained and other parts will not be explained when it is deemed that they may unnecessarily obscure the subject matter of the invention.

Also, the meaning of the terms used in the specification and the appended claims should not be construed as being confined to common or dictionary meaning, but should be construed as concepts not departing from the spirit and scope of the present invention in order to describe the present invention in the most appropriate way. Throughout this specification, the term 'set' means a load.

Figure 1:
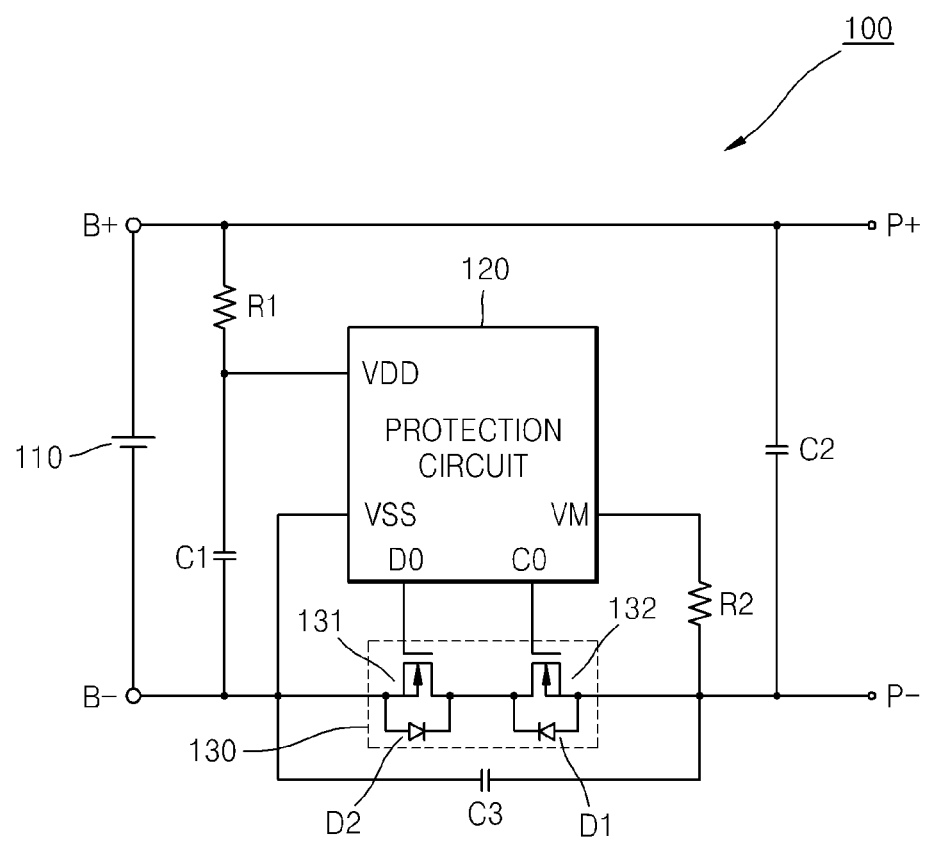
FIG. 1 is a circuit diagram of a battery pack.

FIG. 1 is a circuit diagram of a battery pack 100.

Referring to FIG. 1, the battery pack 100 includes a battery cell unit 110, a protection circuit 120, and a charge-discharge switch 130. The battery cell unit 110 may be connected in parallel to power terminals P+ and P− of the battery pack 100. The protection circuit 120 is connected in parallel to the battery cell unit 110, detects overcharging and over-discharging of the battery cell unit 110, and controls a process regarding the overcharging and over-discharging in a predetermined order. The charge-discharge switch 130 is connected in series between one terminal of the battery cell unit 110 and one terminal of the power terminal P−, and operates under the control of the protection circuit 120. The power terminals P+ and P− may be connected to a charger and/or an external set. In addition, the charge-discharge switch 130 may include a field effect transistor FET 131, and a field effect transistor FET 132. The field effect transistor FET 131 controls the discharging of the battery cell unit 110, and includes a parasitic diode (D2). The field effect transistor FET 132 controls the charging of the battery cell unit 110, and includes a parasitic diode D1. Each gate of the field effect transistor FET 131 and the field effect transistor FET 132 is connected to the protection circuit 120. In addition, R1 and R2 are resistors for preventing static electricity, and C1, C2 and C3 are capacitors for preventing power turbulence.

The protection circuit 120 turns off a charge switch 132 when the battery cell unit 110 is overcharged, and thus an overcharge state may be stopped. In addition, when the battery cell unit 110 is over-discharged through the power terminals P+ and P−, the protection circuit 120 turns off a discharge switch 131, and thus an over-discharge state may be stopped.

Figure 2:
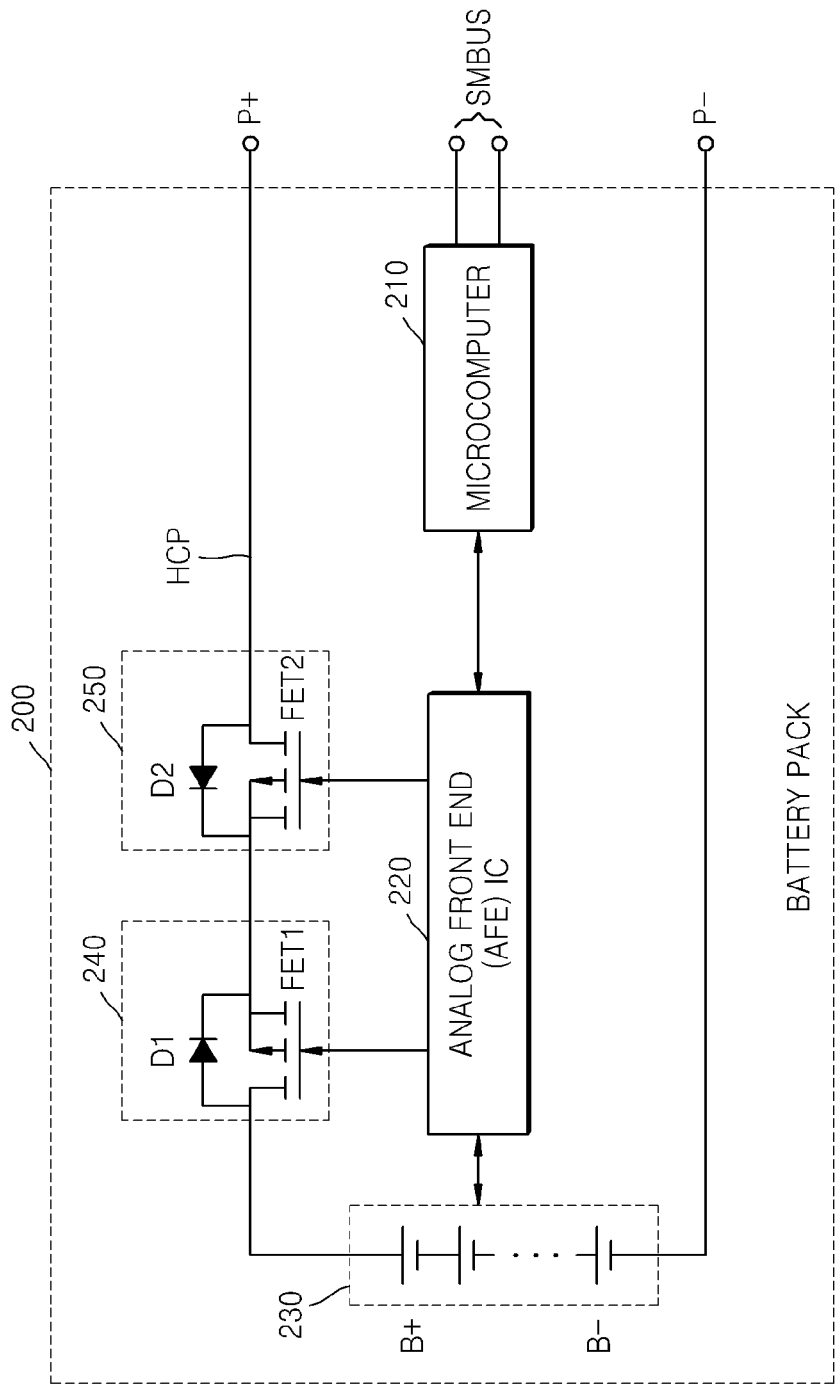
FIG. 2 is a circuit diagram of a battery pack.

FIG. 2 is a circuit diagram of a battery pack 200.

Referring to FIG. 2, the battery pack 200 includes a plurality of battery cell units 230, and a protection circuit. The battery pack 200 is mounted into an external system, such as a portable notebook computer, in order to charge or discharge the battery cell units 230.

The protection circuit may include a microcomputer 210, an analog front end (AFE) integrated circuit (IC) 220, an external terminal (not shown), a charging unit 240, and a discharging unit 250. The microcomputer 210 is connected to the AFE IC 220. The AFE IC 220 is connected in parallel to the battery cell units 230, the charging unit 240, and the discharging unit 250. The charging unit 240 and the discharging unit 250 are connected in series to a high current path (HCP) between the battery cell units 230 and the external terminal.

If it is determined that the battery cell units 230 are overcharged or over-discharged, then the microcomputer 210 turns off the charging unit 240 and the discharging unit 250 so that the battery cell unit 130 may not be charged or discharged any further. The battery pack 200 is connected to the external system via an output terminal in order to be charged or discharged. The HCP path between the external terminal and the battery cell units 230 is used as a charging/discharging path via which a relative high current flows. The battery pack 200 further includes a system management bus (SMBUS) between the microcomputer 210 and the external terminal of the protection circuit in order to communicate with the external system.

The battery cell units 230 are rechargeable secondary battery cells in which B+ and B− denote battery power terminals and P+ and P− denote power terminals of the battery pack 200. The battery cell units 230 transmits to the AFE IC 220 various information regarding the inside thereof, e.g., the temperature and voltage of the battery cell units 230 and cell-related information, e.g., the amount of current flowing through the battery cell units 230.

The charging unit 240 and the discharging unit 250 are connected in series to the HCP path between the external terminal and the battery cell units 230 in order to charge or discharge the battery pack 200. Each of the charging unit 240 and the discharging unit 250 may include a field effect transistor FET.

The AFE IC 220 is connected in parallel to the battery cell units 230, the charging unit 240, and the discharging unit 250, and is connected in series between the battery cell units 230 and the microcomputer 210. The AFE IC 220 detects the voltage of the battery cell units 230, transmits the detection result to the microcomputer 210, and controls the operations of the charging unit 240 and the discharging unit 250 under the control of the microcomputer 210.

The microcomputer 210 may be an IC that is connected in series between the AFE IC 220 and the external system, and controls the charging unit 240 and the discharging unit 250 via the AFE IC 220, thereby preventing the battery cell units 230 from being overcharged, being over-discharged, or being supplied with overcurrent. That is, the microcomputer 210 compares the voltage of the battery cell units 230, which is indicated in the detection result received from the AFE IC 220, with an overcharge voltage set in the microcomputer 210, and then transmits a control signal according to the comparison result to the AFE IC 220 in order to turn on or off the charging unit 240 and the discharging unit 250. Accordingly, it is possible to prevent the battery cell units 230 from being overcharged, or being over-discharged.

For example, if the voltage of the battery cell units 230 is equal to or greater than an overcharge voltage, e.g., 4.35 V, then the microcomputer 210 determines that the battery cell units 230 is overcharged and transmits a control signal according to the determination result to the AFE IC 220 in order to turn off a field effect transistor FET 1 of the charging unit 240. Then, the battery cell units 230 is prevented from being charged from an adaptor connected to the external system. In contrast, if the voltage of the battery cell units 230 is less than an over-discharge voltage set in the microcomputer 210, e.g., 2.30 V, then the microcomputer 210 determines that the battery cell units 230 is over-discharged and transmits a control signal according to the determination result to the AFE IC 220 in order to turn off a field effect transistor FET2 of the discharging unit 250. Then, discharging is prevented from occurring from the battery cell units 230 to the load of the external system. In this case, the AFE IC 220 controls switching operations of the charging unit 240 and the discharging unit 250 under the control of the microcomputer 210. Alternatively, the microcomputer 210 may directly control the switching operations of the charging unit 240 and the discharging unit 250.

Figure 3:
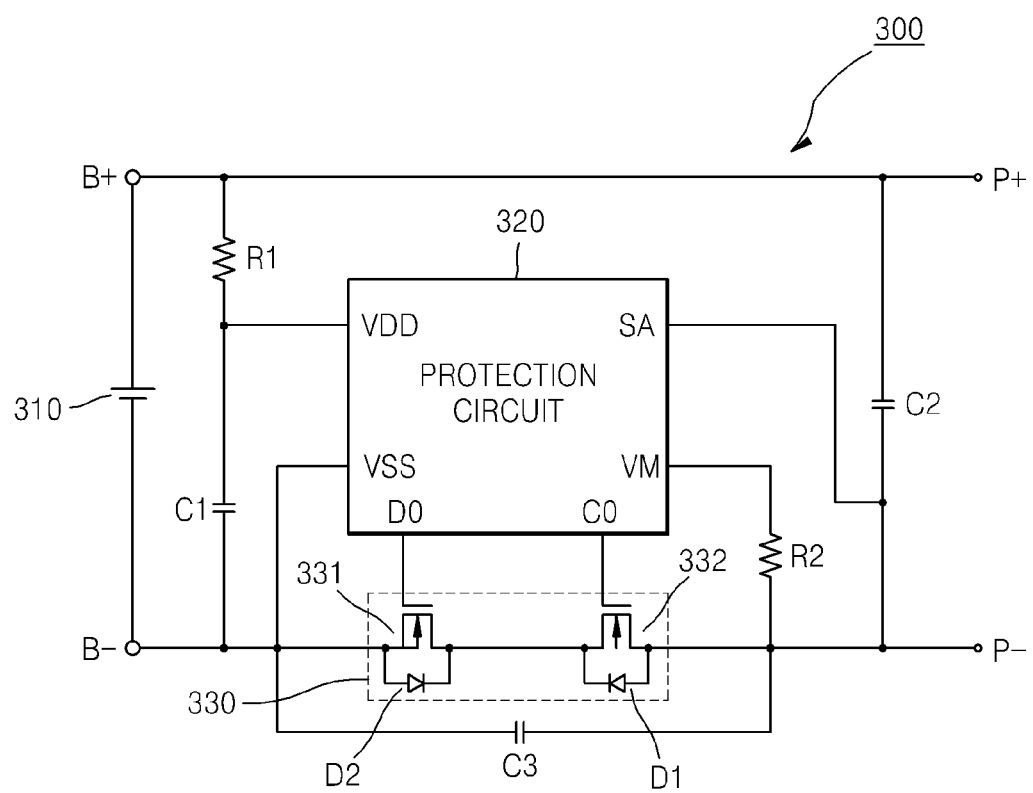
FIG. 3 is a circuit diagram of a battery pack according to some embodiments of the present invention.

FIG. 3 is a circuit diagram of a battery pack 300 according to some embodiments of the present invention.

Referring to FIG. 3, the battery pack 300 includes a battery cell unit 310, a protection circuit 320 that is connected in parallel to the battery cell unit 310, and a charge-discharge switch 330. Functions of other elements of the battery pack 300 are the same as in FIG. 1.

The protection circuit 320 includes six connecting terminals, that is, a first power terminal VDD that is connected to a positive terminal B+ of the battery cell unit 310 via a resistor R1, a second power terminal VSS connected to a negative terminal of the battery cell unit 310, a discharge control terminal DO connected to a discharge switch 331, a charge control terminal CO connected to a charge switch 332, an overcurrent detection terminal VM connected to a negative power terminal P−, of the battery pack 300, via a resistor R2, and a detection terminal SA for detecting a consumption current of a load connected to the negative power terminal P−. In this case, the battery pack 300 includes a single battery cell, and is connected to terminals of the protection circuit 320.

As shown in FIG. 3, the detection terminal SA is connected to the negative power terminal P−, and a connection terminal of a set (not shown) in order to detect a consumption current flowing through a connection terminal of the set. The protection circuit 320 detects the consumption current of the set through the detection terminal SA, compares the detected consumption current with a threshold current, and determines whether the set operates or not. In detail, the protection circuit 320 may input a voltage converted from the detected consumption current of the set, and a ground voltage of the protection circuit 320 (i.e., the battery pack 300) to a comparator, and may determine whether the set operates or not based on the comparison. For example, when the consumption current of the set is equal to or higher than 100 μA, it is determined that the set is turned on. Then, if the consumption current of the set changes for a predetermined period of time, for example, by 1 mA or greater for three seconds, it is determined that the set is turned on. However, if the consumption current of the set changes by a value less than 1 mA for three seconds, it is determined that the set is turned off. In this case, a threshold value of the consumption current of the set, a threshold value of a variation amount of the consumption current, and a predetermined period of time may be determined according to the specifications of the set or may be randomly determined.

When it is determined that the set is turned on or the set operates normally, the protection circuit 320 may maintain an on-state of a discharge control terminal D0 so as to maintain an on-state of the discharge switch 331. Thus, power of the battery cell unit 310 may be continuously supplied to the set.

The protection circuit determines if the set is turned off or in a stand-by mode. For example, when the consumption current of the set is less than 100 µA, or the consumption current of the set is less than 100 µA, and a variation amount of the consumption current of the set is less than 1 mA, the protection circuit 320 determines that the set is turned off. When it is determined that the set is turned off, the protection circuit 320 changes the discharge control terminal DO to an off-state so as to turn off the discharge switch 331, thereby preventing power of the battery cell unit 310 from being applied to the set. Thus, when the set does not operate, power of the battery pack 300 is shut off, and thus the power of the battery pack 300 is not wasted. This solves the problem of wasted consumption current in the case where the set does not operate normally, thereby preventing a battery pack voltage from being lowered.

Figure 4:
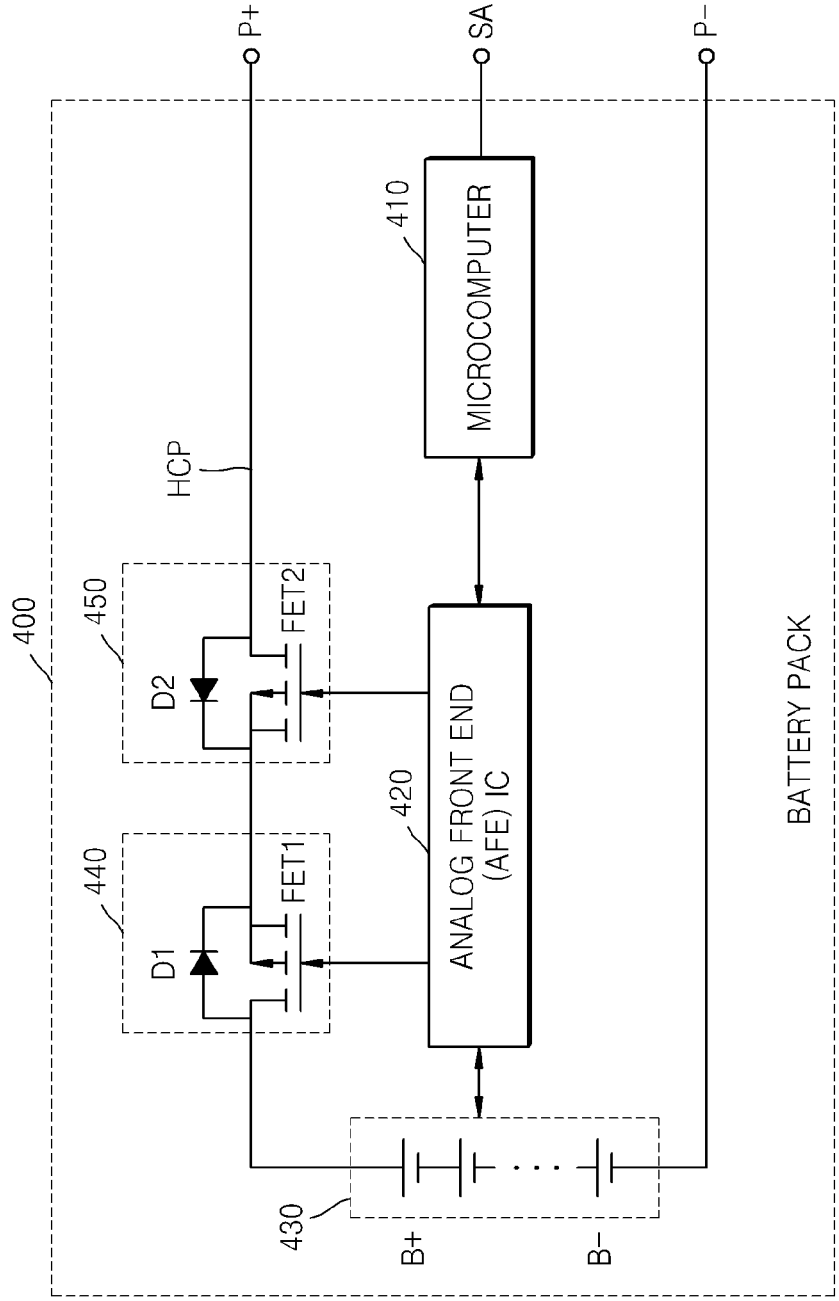
FIG. 4 is a circuit diagram of a battery pack according to some embodiments of the present invention.

FIG. 4 is a circuit diagram of a battery pack 400 according to some embodiments of the present invention.

Referring to FIG. 4, the battery pack 400 includes a microcomputer 410, an AFE IC 420, a plurality of battery cell units 430, an external terminal (not shown), a charging unit 440, and a discharging unit 450. The microcomputer 410 is connected to the AFE IC 420. The AFE IC 420 is connected in parallel to the battery cell units 430, the charging unit 440, and the discharging unit 450. The external terminal is connected to terminals P+ and P− of the battery pack 400. The charging unit 440 and the discharging unit 450 are connected in series to a HCP between the battery cell unit 430 and the external terminal. Functions of other elements in the battery pack are the same as in FIG. 2.

The microcomputer 410 detects the consumption current of a load or a set through the detection terminal SA. The detection terminal SA is connected directly to a ground terminal of the set. The microcomputer 410 will be described in more detail with reference to FIG. 5.

Figure 5:
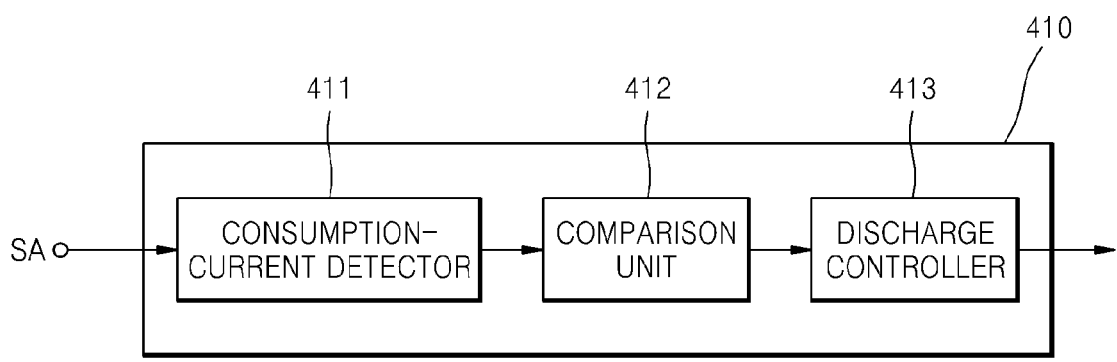
FIG. 5 is a block diagram of a microcomputer of FIG. 4, according to some embodiments of the present invention.

Referring to FIG. 5, the microcomputer 410 includes a consumption-current detector 411, a comparison unit 412, and a discharge controller 413.

The consumption-current detector 411 detects the consumption current flowing through a connection terminal of the load through the detection terminal SA.

The comparison unit 412 determines whether the detected consumption current is less than a first threshold value. For example, it is determined whether the consumption current is less than 100 µA. When the consumption current is equal to or greater than 100 µA, it is determined that the set operates normally. When the consumption current is less than 100 µA, it is determined that the set does not operate normally.

Selectively, when the consumption current is less than the first threshold value, for example, 100 µA, the comparison unit 412 determines whether a variation amount of the consumption current is less than the second threshold value within a predetermined period of time. For example, it is determined whether a variation amount of the consumption current is less than 1 mA within three seconds. That is, if a variation amount of the current consumption is equal to or greater than 1 mA within three seconds, it is determined that the set operates normally. If not, it is determined that the set does not operate normally. For example, in this case, it is determined that the set is turned off or in a stand-by mode. The first and second threshold values and the predetermined period of time may be determined according to specifications of the set or may be randomly determined.

The discharge controller 413 is operated based on the determination result of the comparison unit 412. If it is determined that the set is turned off or does not operate normally, the discharge controller 413 outputs a discharge control signal for turning off a discharge switch 450 illustrated in FIG. 4. For example, if it is determined that the consumption current of the set is less than the first threshold value, or the consumption current of the set is less than the first threshold value and the variation amount of the consumption current is equal to or greater than the second threshold value, it is determined that the set is turned off or does not operate normally. As a result, discharge controller 413 outputs a discharge control signal for turning off a discharge switch 450 illustrated in FIG. 4. The discharge controller 413 transmits the discharge control signal to an AFE IC 420, and turns off the discharge switch 450 according to the discharge control signal. Thus, power supplied from a battery cell unit 430 is shut off to the set.

Figure 6:
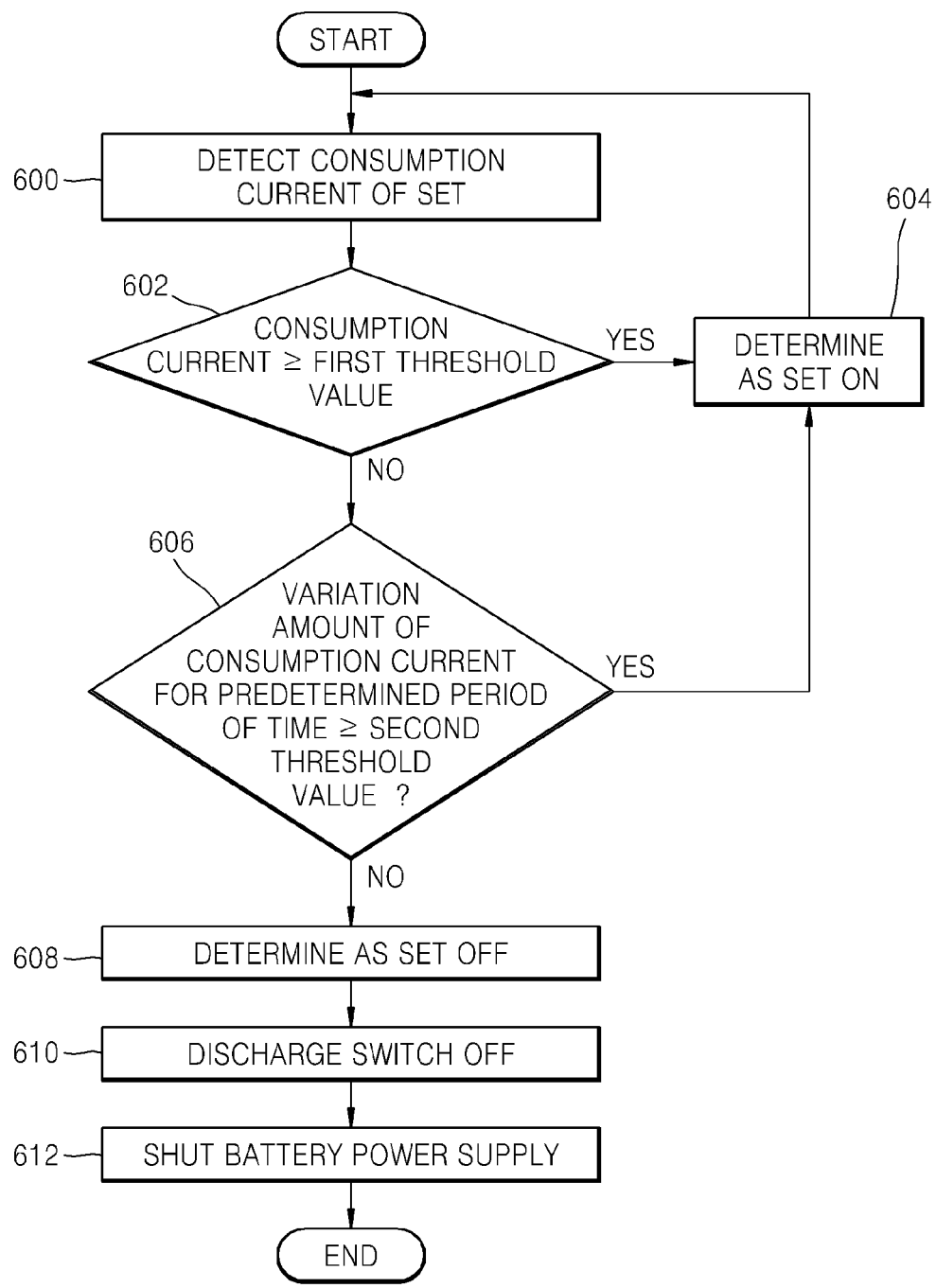
FIG. 6 is a flowchart of a method of controlling a battery pack, according to some embodiments of the present invention.

FIG. 6 is a flowchart of a method of controlling a battery pack, according to some embodiments of the present invention.

Referring to FIG. 6, in operation 600, a consumption current of a set is detected. In this case, a protection circuit or a microcomputer may include a detection terminal for detecting the consumption current. The detection terminal is connected to a ground terminal of the set, in order to detect the consumption current flowing through the ground terminal of the set.

In operation 602, it is determined whether the detected consumption current is less than a first threshold value. In this case, the first threshold value may be determined according to the specifications of the set or may be randomly determined, and is a primary standard value for determining whether the set operates normally or not.

As a result of the determination in operation 602, if the consumption current is equal to or greater than the first threshold value, it is determined that the set is turned on, in operation 604, and then operation 600 is performed.

As a result of the determination in operation 602, if the consumption current is less than the first threshold value, it is determined whether a variation amount of the consumption current is equal to or greater than a second threshold value within a predetermined period of time, in operation 606. The second threshold value may be determined according to specifications of the set, and is a secondary standard value for determining whether the set operates normally or not.

As a result of the determination in operation 606, if the variation amount of the consumption current is equal to or greater than the second threshold value, it is determined that the set is turned on, in operation 604, and then the method returns to operation 600, and operation 600 is performed again. In this case, the method is performed from operation 600 again, in FIG. 6. Alternatively, the method may return to operation 606, and then it may be determined if a variation amount of the consumption current is within a predetermined period of time again.

As a result of the determination in operation 606, if the variation amount of the consumption current is less than the second threshold value, it is determined that the set is turned off, in operation 608.

In operation 610, a discharge switch is turned off, and power supplied from a battery is shut off to the set.

The invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

As described above, according to the one or more of the above embodiments of the present invention, a battery pack detects a consumption current of load, and shuts off power, thereby preventing power of the battery pack from being wasted as the consumption current of the load.

It should be understood that the exemplary features of embodiments described herein should be considered in a descriptive sense only and not for purposes of limitation. Descriptions of features or aspects within each embodiment should typically be considered as available for other similar features or aspects in other embodiments.

What is claimed is:

1. A battery pack comprising:
   a battery cell; and
   a protection circuit for the battery cell,
   wherein the protection circuit is configured to detect: i) consumption current of a load and ii) a range of variation in the consumption current over a predetermined time period, and
   wherein the protection circuit is further configured to control discharge in the load according to: i) the detected consumption current and ii) the range of variation in the consumption current over the predetermined time period.

2. The battery pack of claim 1, wherein the protection circuit comprises a detection terminal configured to detect the consumption current which flows through a ground terminal of the load.

3. The battery pack of claim 2, wherein the protection circuit is configured to determine whether the consumption current is less than a first threshold value, and
   wherein, if the detected consumption current is less than the first threshold value, the protection circuit is configured to output a discharge control signal for turning off a discharge switch through a discharge control terminal of the protection circuit.

4. The battery pack of claim 2, wherein the protection circuit is configured to determine whether the consumption current is less than a first threshold value,
   wherein, if the detected consumption current is less than the first threshold value, the protection circuit is further configured to determine whether the range of variation in the consumption current over the predetermined time period is less than a second threshold value, and
   wherein, if the range of variation is less than the second threshold value, the protection circuit is further configured to output a discharge control signal for turning off a discharge switch through a discharge control terminal of the protection circuit.

5. The battery pack of claim 1, wherein the protection circuit comprises an analog front end integrated circuit (AFE IC), and a computer, and
   wherein the computer comprises a detection terminal configured to detect the consumption current of the load.

6. The battery pack of claim 5, wherein the computer comprises:
   a detector configured to detect the consumption current flowing through the ground terminal of the load through the detection terminal;
   a comparator configured to determine whether the consumption current is less than a first threshold value, and if the consumption current is less than the first threshold value, the comparator is further configured to determine whether the range of variation in the consumption current over the predetermined time period is less than a second threshold value; and
   a discharge controller configured to output a discharge control signal for turning off a discharge switch when the range of variation in the consumption current over the predetermined time period is less than the second threshold value.

7. The battery pack of claim 6, wherein the discharge controller is configured to output the discharge control signal to the AFE IC, and
   wherein the AFE IC is configured to turn off the discharge switch, according to the discharge control signal.

8. The battery pack of claim 6, wherein the first threshold value and/or the second threshold value are determined based on the specifications of the load.

* * * * *